US006829254B1

(12) United States Patent
Rajahalme et al.

(10) Patent No.: US 6,829,254 B1
(45) Date of Patent: Dec. 7, 2004

(54) METHOD AND APPARATUS FOR PROVIDING EFFICIENT APPLICATION-LEVEL SWITCHING FOR MULTIPLEXED INTERNET PROTOCOL MEDIA STREAMS

(75) Inventors: Jarno Rajahalme, Andover, MA (US); Pessi Pekka, Helsinki (FI)

(73) Assignee: Nokia Internet Communications, Inc., Espoo (FI)

( * ) Notice: Subject to any disclaimer, the term of this patent is extended or adjusted under 35 U.S.C. 154(b) by 0 days.

(21) Appl. No.: 09/474,048

(22) Filed: Dec. 28, 1999

(51) Int. Cl.[7] ............................................... H04J 3/04
(52) U.S. Cl. ................................. 370/535; 370/466
(58) Field of Search .............................. 370/389, 395.1, 370/395.3, 395.52, 395.6, 401, 417, 466, 467

(56) References Cited

U.S. PATENT DOCUMENTS

| | | | | |
|---|---|---|---|---|
| 5,764,645 A | * | 6/1998 | Bernet et al. ............... | 370/466 |
| 5,963,555 A | * | 10/1999 | Takase et al. ............... | 370/395 |
| 6,046,999 A | * | 4/2000 | Miki et al. .................. | 370/395 |
| 6,094,431 A | * | 7/2000 | Yamato et al. .............. | 370/395 |
| 6,147,999 A | * | 11/2000 | Honda et al. ................ | 370/396 |
| 6,188,689 B1 | * | 2/2001 | Katsube et al. ............. | 370/389 |
| 6,275,494 B1 | * | 8/2001 | Endo et al. .................. | 370/395 |
| 6,304,567 B1 | * | 10/2001 | Rosenberg ................... | 370/356 |
| 6,330,239 B1 | * | 12/2001 | Suzuki ..................... | 370/395.1 |
| 6,377,574 B1 | * | 4/2002 | Endo .......................... | 370/359 |
| 6,512,772 B1 | * | 1/2003 | Karaki et al. ............ | 370/395.5 |
| 6,522,667 B1 | * | 2/2003 | Oda et al. .................... | 370/474 |
| 6,563,794 B1 | * | 5/2003 | Takashima et al. ......... | 370/236 |
| 6,598,080 B1 | * | 7/2003 | Nagami et al. ............. | 709/227 |
| 6,618,378 B1 | * | 9/2003 | Giroux et al. ........... | 370/395.1 |

FOREIGN PATENT DOCUMENTS

| | | |
|---|---|---|
| EP | 0 944 280 A2 | 9/1999 |
| GB | 2322515 A | 8/1998 |
| WO | WO 00/52884 | 8/2000 |

OTHER PUBLICATIONS

Subbiah B. et al., "User Multiplexing in RTP payload between IP Telephony Gateways," Aug. 21, 1998, XP–002127741, pp. 17.

Sudan M. et al., "Gateway Based Approach for Conducting Multiparty Multimedia Sessions Over Heterogeneous Signaling Domains," IEEE Infocom 97' The Conference on Computer Communications. 16th Annual Joint Conference of the IEEE Computer and Communications Societies. Driving the Information Revolution. Kobe, Apr. 7, 1997, Los Alamitos, CA: IEEE Compu, vol. 2, pp. 701–710.

"User Multiplexing in RTP payload between IP Telephony Gateways", B. Subbiah et al., internet site http://www.jetf.org/internet–drafts/draft–ietf–avt–mux–rtp–00.txt, Aug. 21, 1998, 17 pages.

* cited by examiner

Primary Examiner—Alpus H. Hsu
Assistant Examiner—Toan Nguyen
(74) Attorney, Agent, or Firm—Squire, Sanders & Dempsey L.L.P.

(57) ABSTRACT

A method and apparatus for efficient switching of multiplexed streams by mapping multiplexed frames with channel identifiers in multiplexed streams to corresponding output streams and channel identifiers. A system in accordance with the principles of the present invention includes a plurality of input ports for receiving packets for switching, a plurality of output ports, each of the plurality of output ports having an output queue and a switching fabric, disposed between the plurality of input and output ports. The switching fabric identifies an input multiplexed stream to which a received packet belongs, notes the channel identifier of each frame in the received packet, identifies an output multiplexed stream and channel identifier corresponding to the input multiplexed stream and channel identifier for each frame in the received packet and inserting each frame for transmission to the output queue associated with the identified corresponding multiplexed stream and channel identifier.

24 Claims, 10 Drawing Sheets

METHOD AND APPARATUS FOR PROVIDING EFFICIENT APPLICATION-LEVEL SWITCHING FOR MULTIPLEXED INTERNET PROTOCOL MEDIA STREAMS

BACKGROUND OF THE INVENTION

1. Field of the Invention

This invention relates in general to IP telephony, and more particularly to method and apparatus for providing efficient application-level switching for multiplexed Internet Protocol media streams.

2. Description of Related Art

Traditionally, voice has been carried over circuit switched networks (CSN) that are designed especially for transmitting voice, e.g. PSTN and GSM. During the past twenty years, telephone systems have steadily improved and changed as businesses became dependent upon reliable communication that could overcome barriers of time and distance. As a result, enterprise-wide communications platforms have been developed to deliver a broad range of telephony services. The networking services available on these platforms include automatic least-cost routing and class-of-service routing, and applications such as voice mail, mobility and call centers.

During this same time period, packet switching also grew to provide reliable and easy-to-use file transfer, transaction processing and information access. Packet switching systems were first implemented as proprietary systems running over private lines. However, today packet switching has evolved into standards-based, virtual-circuit networks, e.g., frame relay and Asynchronous Transfer Mode (ATM), and the Internet Protocol. The development and wide implementation of Ethernet in the 1980s led to bridges and routers and, more recently, local area network (LAN) switching. Transfer speeds have increased, prices have decreased and there are now more than 200 million Internet and Ethernet users worldwide.

Currently, there is a lot of interest for the transmission of voice over packet switched networks (PSN). The next big development in telecommunications will be combining the Internet with mobile phones and other devices such as personal digital assistants (PDAs). Soon consumers will be using small communication devices that combine features such as mobile telephones, Internet terminals, music systems, video systems, cameras, etc. Further, the Internet and the growing convergence around the Internet Protocol (IP) present great opportunities for businesses to capture new markets, serve customers better, reduce costs and improve productivity.

The biggest challenge facing IP telephony will be accommodating business-critical applications. They include call centers, Interactive Voice Response (IVR), and other speech-activated applications, mobility and single-number roaming services, and unified messaging.

These types of applications accentuate the need for IP telephony to address the difficult issue of transmission quality. Over time, the telephone network has become very reliable and delivers consistently high-quality service. In contrast, on today's intranets and the public Internet, the quality of service is virtually nonexistent. File download times and the time required to pull up a web site varies, and the time for e-mail to reach its intended destination is dependent upon many network factors. Increasing the bandwidth of Internet links has been the focus of most efforts to improve the quality of service. However, increasing bandwidth is only a partial fix for the short term. In the long run, other strategies are required.

At present, IP networks offer a single class of service called best effort, which can not guarantee any Quality of Service (QoS) to applications. To support delay sensitive applications such as voice and interactive multimedia, there have been many proposals submitted to the Internet Engineering Task Force (IETF) on how to integrate QoS in IP networks. These proposals include differentiated service (diff-serv), Integrated services (Int-serv) and Multi Protocol Label Switching (MPLS). Despite these efforts, QoS in IP is still elusive and could take some time before it is deployed over global Internet.

As suggested above, IP telephony has emerged as a potential application to challenge the traditional phone companies by offering long distance telephone service over Internet for low prices. There are a large number of equipment vendors offering IP telephone gateways and accessories to provide IP telephony service to corporate customers and Internet Service Providers (ISPs). IP telephone standards such as H.323, Session Initiation Protocol (SIP), and Media Gateway Control Protocol (MGCP), have been standardized to enhance the rapid deployment of IP telephone services in the global Internet. Even though, IP telephone is not a reality in the public Internet today, it has been more successful in Intranet and Virtual Private Networks (VPN) environments.

In trials, IP telephone services have been demonstrated to have the potential to match the voice quality offered by traditional telephone networks. As a result, the growth of IP telephone gateways in corporate and ISP environments is expected to increase exponentially in the coming years. IP telephone gateways act as an interface between the existing PSTN and PBX networks and IP networks. This method allows one PSTN user to call another PSTN user connected through IP telephone gateways thus eliminating the need for long distance telephone network.

In a IP telephony connection, two sides of the PSTN/PBX users (two branches of the same company) are interconnected by IP telephone gateways. In such application, a telephone call between two PSTN/PBX users located at either side of the gateways is carried by a separate Real-time Transport Protocol/User Datagram Protocol/Internet Protocol (RTP/UDP/IP) connection. RTP is an Internet protocol for transmitting real-time data such as audio and video. RTP itself does not guarantee real-time delivery of data, but it does provide mechanisms for the sending and receiving applications to support streaming data. Typically, RTP runs on top of the UDP protocol, although the specification is general enough to support other transport protocols. The User Datagram Protocol is a connectionless protocol that, like TCP, runs on top of IP networks. Unlike TCP/IP, UDP/IP provides very few error recovery services, offering instead a direct way to send and receive datagrams over an IP network.

IP telephony gateways provide an interface between the existing circuit switched telephone networks (such as PSTN and GSM) and the packet switched IP data networks. In traditional IP telephony applications, telephone calls between PSTN users interconnected by a pair of IP telephony gateways to compress incoming PSTN speech generate speech frames with sizes ranging from 5 to 20 octets per speech frame.

For example, G.723.1 (the most popular IP telephony codec and the International Multimedia Teleconferencing Consortium's (IMTC) Voice over IP (VoIP) mandatory low bit-rate codec), generates a 20 byte speech packet at 30 ms intervals. Many codecs used in cellular environment generate less than 10 byte packet per speech sample. Small size packets are subjected to large overhead when transferred using the Real time Transport Protocol (RTP). The RTP/UDP/IP overhead is 40 bytes (12+8+20) for a simple speech packet. For example, a 10 byte packet transferred via RTP/UDP/IP increases the overhead to 80% (40 byte overhead/50 byte overhead plus packet). In addition, for each call request a single UDP/IP connection (a pair of UDP ports) is established between the gateways requiring a large state (memory) to be maintained at the telephony gateways, thereby making these less scaleable.

Congestion in IP networks results in packet loss at routers and UDP does not have any retransmission mechanism to recover lost packets. Also, real time applications such as speech is intolerant to delay caused by re-transmission. In traditional RTP method, each individual speech frame is transmitted as a IP packet, which generates a large number of packets between gateways. This heavy traffic volume is a potential situation for congestion and packet loss at IP routers.

To overcome these this problem, an efficient real-time transport protocol multiplexing method and apparatus for transporting compressed speech between IP telephony gateways has been proposed in co-pending and commonly-assigned U.S. patent applications Ser. No. 09/137,276, by Baranitharan Subbiah, entitled "METHOD AND APPARATUS FOR PROVIDING EFFICIENT USER MULTIPLEXING IN A REAL-TIME PROTOCOL PAYLOAD FOR TRANSPORTING COMPRESSED SPEECH BETWEEN IP TELEPHONY GATEWAYS, herein referred to as "Subbiah." Subbiah describes a protocol that eliminates bandwidth usage inefficiencies in transporting short packets between nodes connected by an IP network, wherein the method and apparatus enables a number of users to share a single RTP/UDP/IP connection. The protocol includes creating a header for a plurality of data packets, each header providing identification of a user associated with a packet, adding each header to the data packet associated therewith to form mini-IP payloads, multiplexing the mini-IP payloads into a RTP payload and transmitting the RTP payload over a single RTP/UDP/IP connection.

While Subbiah disclose a method and apparatus for providing application layer multiplexing in IP networks to overcome the problem of high header overhead for packets with small payloads, some problems remain. For example, if the multiplexing is used between two IP nodes only, there is no need for switching. However, if more complex topologies are considered, the issue of switching of the multiplexed streams arises.

It can be seen then that there is a need for a method and apparatus provides for efficient switching of multiplexed streams.

SUMMARY OF THE INVENTION

To overcome the limitations in the prior art described above, and to overcome other limitations that will become apparent upon reading and understanding the present specification, the present invention discloses a method and apparatus for efficient switching of multiplexed frame-based streams.

The present invention solves the above-described problems by providing a method and apparatus that maps multiplexed frames with channel identifiers in multiplexed input streams to corresponding output streams and channel identifiers.

A system in accordance with the principles of the present invention includes a plurality of input ports for receiving packets for switching, a plurality of output ports, each of the plurality of output ports having an output queue and a switching fabric, disposed between the plurality of input and output ports, the switching fabric switching multiplexed streams received from the plurality of ports to the plurality of output ports, wherein the switching fabric identifies an input multiplexed stream to which a received packet belongs, notes the channel identifier of each frame in the received packet, identifies an output multiplexed stream and channel identifier corresponding to the input multiplexed stream and channel identifier for each frame in the received packet and inserts each frame for transmission to the output queue associated with the identified corresponding multiplexed stream and channel identifier.

Other embodiments of a system in accordance with the principles of the invention may include alternative or optional additional aspects. One such aspect of the present invention is that the switch fabric determines when an output queue is full and sends the contents of the output queue when the output queue is determined to be full.

Another aspect of the present invention is that the system further includes an input IP/ATM interface at each of the plurality of ports for receiving multiplexed IP packets and converting the received multiplexed IP packets to ATM cells as packets for switching.

Another aspect of the present invention is that the input IP/ATM interface converts a received multiplexed IP packet to ATM cells by noting the multiplex stream to which a received multiplexed IP packet belongs, identifying the channel identifier for each media frame in the received multiplexed IP packet, creating a new ATM payload having a ATM cell header, the ATM cell header including a VPI:VCI pair mapped from the noted multiplexed stream and each identified channel identifier and sending the new ATM payload including frame header as a packet for switching.

Another aspect of the present invention is that the frames for transmission in the output queues include ATM cells having a payload.

Another aspect of the present invention is that the system further includes output IP/ATM interfaces associated with each of the plurality of output ports for converting ATM cells to multiplexed IP packets, the IP/ATM interfaces converting the ATM cells to multiplexed IP packets notes the VPI:VCI pair of each the ATM cells received from the queues as frames for transmission, maps the VPI:VCI pair of each the ATM cells received from the queues as frames for transmission to an identified multiplexed stream associated with a channel identifier, inserts the payload as a frame to an IP output queue of the identified multiplexed stream with the channel identifier and transmits the IP output queue when the IP output queue is determined to be full.

Another aspect of the present invention is that the output IP/ATM interlace recovers the sequence number, length indicator from the ATM cell.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for efficient switching of multiplexed streams by mapping multiplexed frames with channel identifiers in multiplexed streams to corresponding output streams and channel identifiers.

Figure 1:
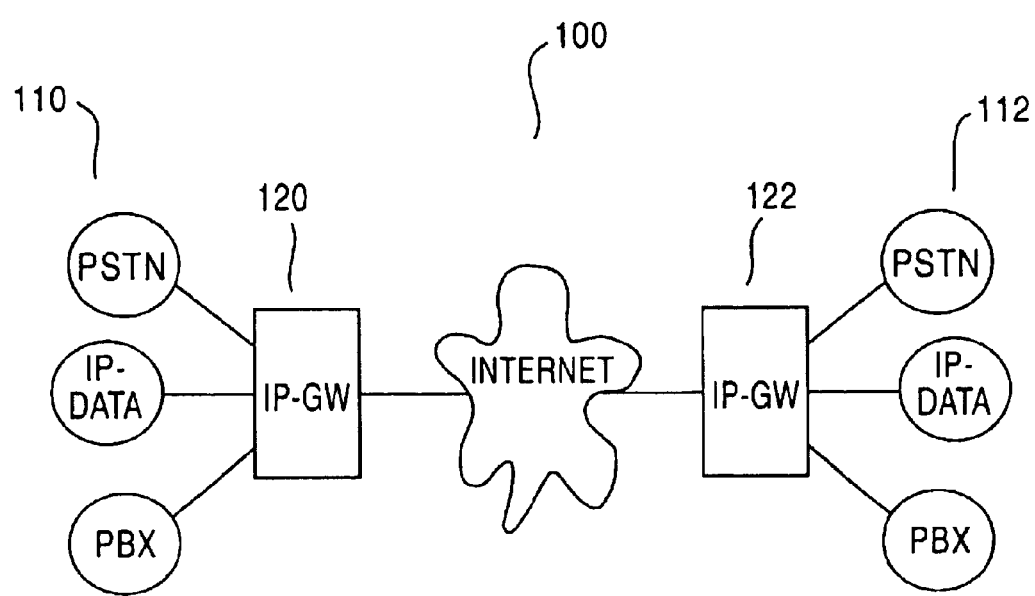
FIG. 1 shows an application scenario in which two sides of the PSTN/PBX are interconnected by IP telephone gateways.

FIG. 1 shows an application scenario 100 in which two sides of the PSTN/PBX 100, 112 (two branches of the same company) are interconnected by IP telephone gateways 120, 122. In such an application, a telephone call between PSTN/PBX users 110, 112 located at either side of the gateways 120, 122 is carried by a separate RTP/UDP/IP connection. The codecs used at the telephone gateway to compress incoming PSTN/PBX voice calls generates packets with a size ranging from 5 to 20 bytes.

For example, the IP telephone standard G.723.1 specifies a codec that generates a 20 byte packet at the interval of 30 ms speech sample. Many codecs used in cellular environments generate a small packet, e.g., on the average a 10 byte packet per speech sample. These small size packets cause large overhead when they are transferred using the Real time Transport Protocol (RTP).

The RTP/UDP/IP overhead is 40 bytes (12+8+20) for each speech packet. For example, if a 10 byte packet is transferred via RTP/UDP/IP then the overhead is 80%, i.e., 40/50. In addition, for each call a pair of separate UDP/IP connections, one in each direction, is established between the gateways 120, 122 requiring a large number of protocol control blocks (memory) to be maintained at the telephone gateways 120, 122.

Congestion in IP networks results in packet loss at routers and UDP does not have any retransmission mechanism to recover lost packets. Also, real time applications such as speech are intolerant to delay caused by re-transmission. In a traditional RTP method, each individual speech packet is transmitted as a separate IP packet, which generates a large number of packets between gateways. This heavy traffic volume is a potential situation for congestion and packet loss at IP routers.

The large overhead to transfer small packets (compressed speech) through RTP/UDP/IP has been one of the drawbacks of the IP telephony. In order to minimize the overhead, RTP/UDP/IP header compression is applied for slow speed links. However, this method requires compressing/decompressing at routers as well as some additional processing overhead.

To reduce header overhead where separate RTP sessions are used for each user connected to a pair of gateways, payloads from multiple users may be multiplexed into the same RTP session. However, a multiplexing protocol is required to delineate multiplexed packets. Even without compression, an equal or better bandwidth efficiency may still be achieved by multiplexing two or more (e.g., up to 256) low bit rate connections in a single RTP/IP/UDP connection.

Figure 2:
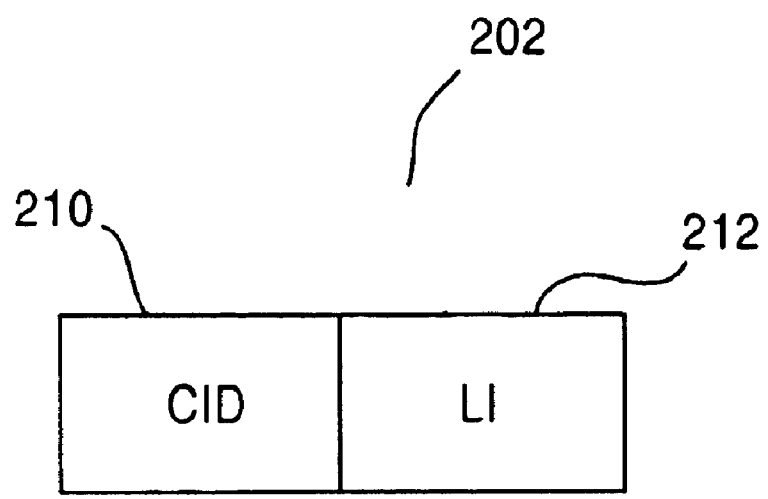
FIG. 2 illustrates a small header for use in multiplexing packets from different users into a single payload.

There are many variants of media frame multiplexing, e.g., the Subbiah multiplexing scheme described above. Those skilled in the art will recognize that the present invention is not meant to be limited to a particular media frame multiplexing scheme. Rather, those skilled in the art will recognize that the use of a small header 202 as illustrated in FIG. 2 enables multiplexing of multiple small size frames into a single payload 300 as illustrated in FIG. 3.

For example, to identify a single user among the number of users sharing the RTP connection, each user is allocated an unique Channel Identifier (CID) 210. The CID negotiation procedures may be integrated with the IP telephony media channel transport parameter and the CID assigned at the time of IP telephony call signaling.

To identify mini packets multiplexed on a single payload, a small header 202 may be used for each small packet multiplexed into a single payload. The small header 202, as shown in FIG. 2 includes a Channel Identifier (CID) 210 and a Length Indicator (LI) 212. The CID field 210 identifies a single stream among streams sharing a single connection. The LI field 212 indicates the size of the payload (speech packet). Thus, the small header 202 allows many streams to share a single connection thus reducing the packet overhead. Those skilled in the art will recognize that other fields, field lengths and forms are also possible without departing from the scope of the present invention.

Figure 3:
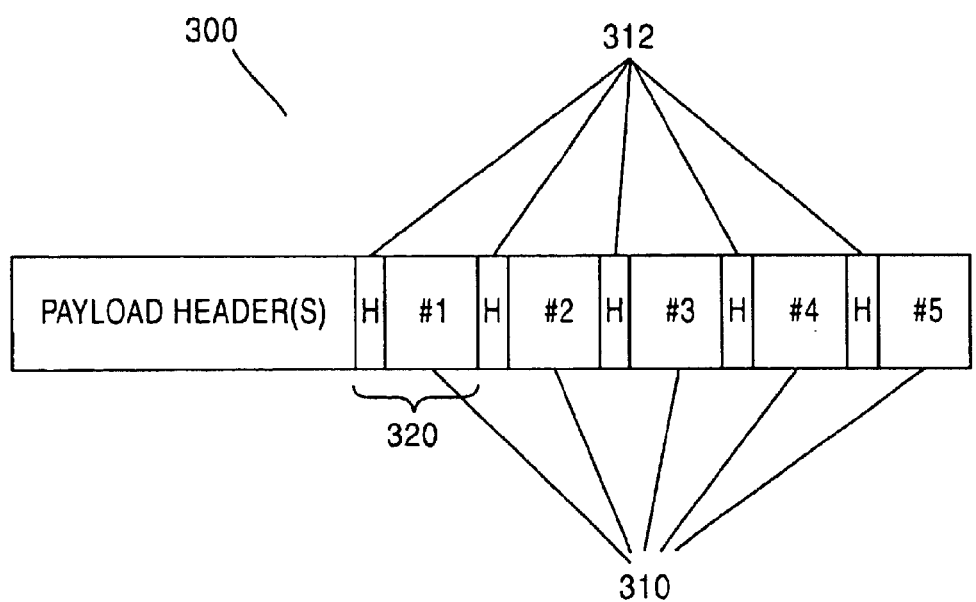
FIG. 3 illustrates the multiplexing of small packet into a signal payload using the small headers.

The assembly of small packets into a single payload 300 is shown in FIG. 3. The mini packets 310 follow the RTP header 312 and each mini packet 320 is delineated by small header 312. This approach requires a simple demultiplexing algorithm at the receiver. Because the small header 312 in the payload 300 is transparent to the intermediate IP routers, the multiplexing of small packets into a single payload does not cause any problems in terms of IP packet forwarding and other functionality at the IP layer.

Figure 4:
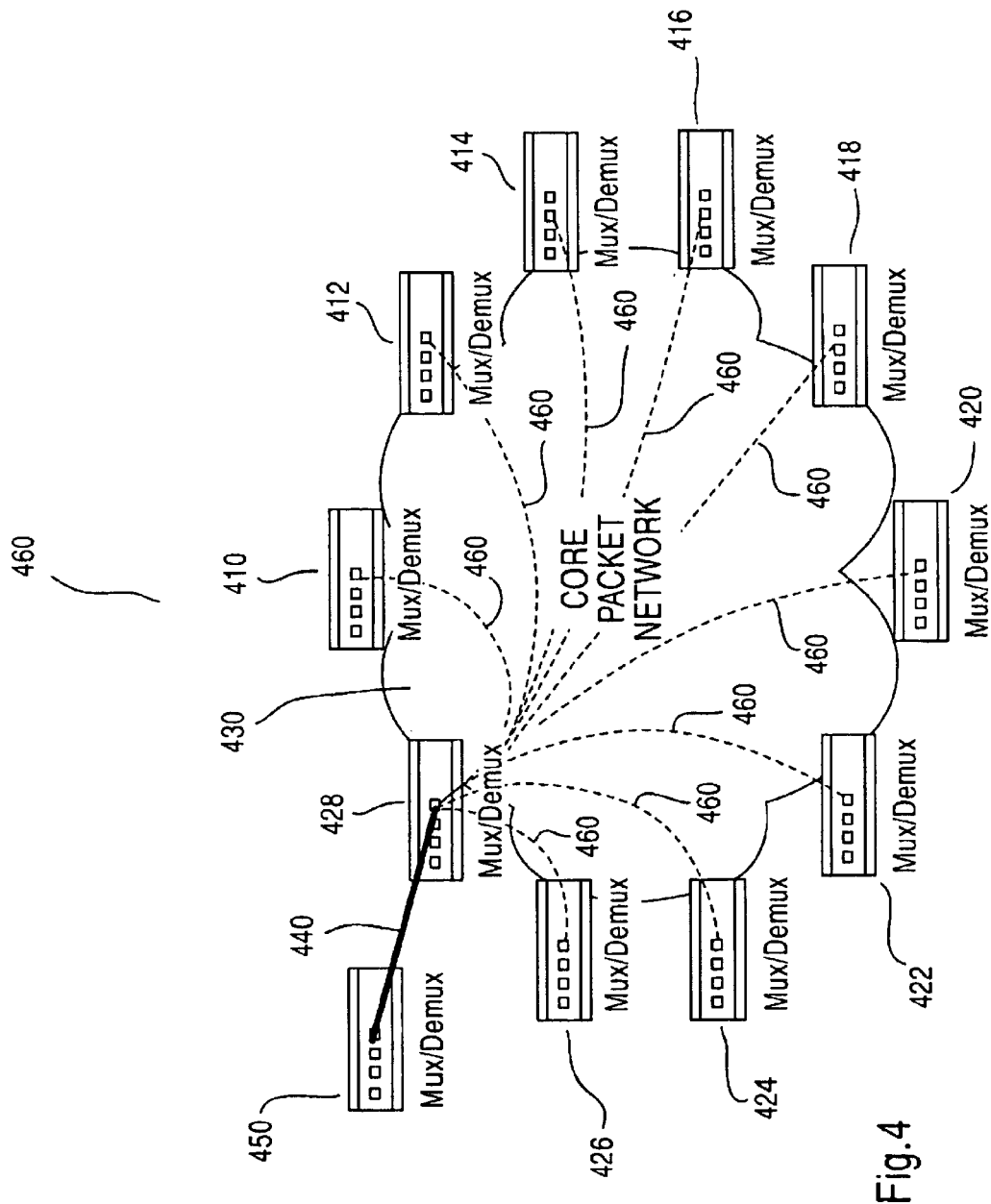
FIG. 4 illustrates the problem with routing multiplexed steams in a non-trivial topology.

However, the usage of such a multiplex scheme in non-trivial topologies raises the issue of routing. FIG. 4 illustrates the problem with routing multiplexed steams in a non-trivial topology 400. In FIG. 4, multiplexer/demultiplexers 410–428 are illustrated at the periphery of a core packet network 430. A data stream 440 is shown flowing between multiplexer/demultiplexer 450 and multiplexer/demultiplexer 428. From multiplexer/ demultiplexer 428, it can be seen that the individual streams 460 do not usually use the same route from end to end through the network. In other words, individual voice frames 460 must be routed independently from each other at some point on the network 430.

As many frames belonging to multiple media streams are multiplexed to one network packet, the underlying packet network can not perform the routing without separation of the multiplexed streams 440 to many independent network streams 460. When demultiplexing, the per-packet header overhead increases from 1–2 bytes up to 40 bytes (a typical payload is 10–20 bytes per frame). In the worst case, the packet count increases up to 100 times. In such a core network 430, the throughput is limited by the per-packet overhead. Therefore, demultiplexing greatly reduces the advantage of the multiplexing on the whole network 430.

Figure 5:
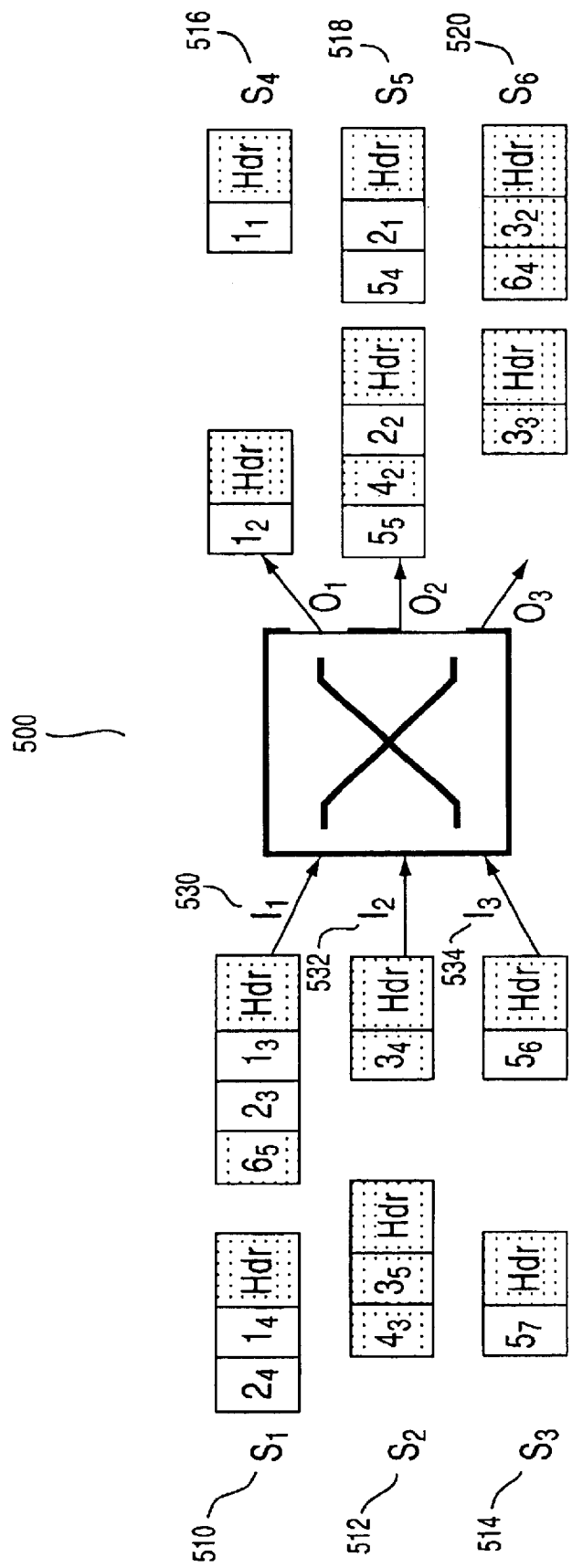
FIG. 5 illustrates application level switching of multiplexed IP streams.

According to the present invention, each media frame stream is uniquely identified. FIG. 5 illustrates application level switching of multiplexed IP streams 500. For example, in FIG. 5, each media frame is identified with a channel identifier (CID), e.g., $1_n, 2_n \ldots 6_n$. In addition, each CID is associated with a particular multiplexed stream, e.g. $S_n$ 510–520. Furthermore, each multiplex stream is uniquely identified by the <destination IP address, UDP port number> pair 530–534 on which the multiplexed packets are to be received. The recipient should receive from the intended source only. Accidental or malicious packets that are sent from other sources should be discarded when received. This information can then be used to decide how to route the individual media frames correctly.

According to the present invention, multiplexed streams are switched within special network nodes, thus avoiding the packet header overhead and the load caused to the network by numerous packets and flows. Because the switching is application-specific, the switching can be easily optimized and implemented in hardware.

For example, Table 1 below illustrates a switching table.

TABLE 1

| Media frame stream | $S_{in}:CID_{in}$ | $S_{out}:CID_{out}$ |
|---|---|---|
| 1 | $S_1:1$ | $S_4:1$ |
| 2 | $S_1:2$ | $S_5:2$ |
| 3 | $S_2:3$ | $S_6:3$ |
| 4 | $S_2:4$ | $S_5:4$ |
| 5 | $S_3:5$ | $S_5:5$ |
| 6 | $S_1:6$ | $S_6:6$ |

Note that the channel identifiers defined above are the same in the incoming and outgoing multiplex streams to facilitate easier illustration. However, those skilled in the art will recognize that in a real situation the channel identifiers would likely be different on the input and the output.

Referring to FIG. 5 and Table 1, it can be seen that CID $1_n$ with multiplexed frame stream $S_1$ is routed to output multiplexed frame stream $S_4$. Likewise, CIDs $2_n, 4_n$ and $5_n$, with multiplexed frame stream $S_1, S_2$ and $S_3$ respectively, are routed to output multiplexed frame stream $S_5$. Finally, CIDs $3_n$ and $6_n$, with multiplexed frame stream $S_3$ and $S_1$ respectively are routed to output multiplexed frame stream $S_6$.

Figure 6:
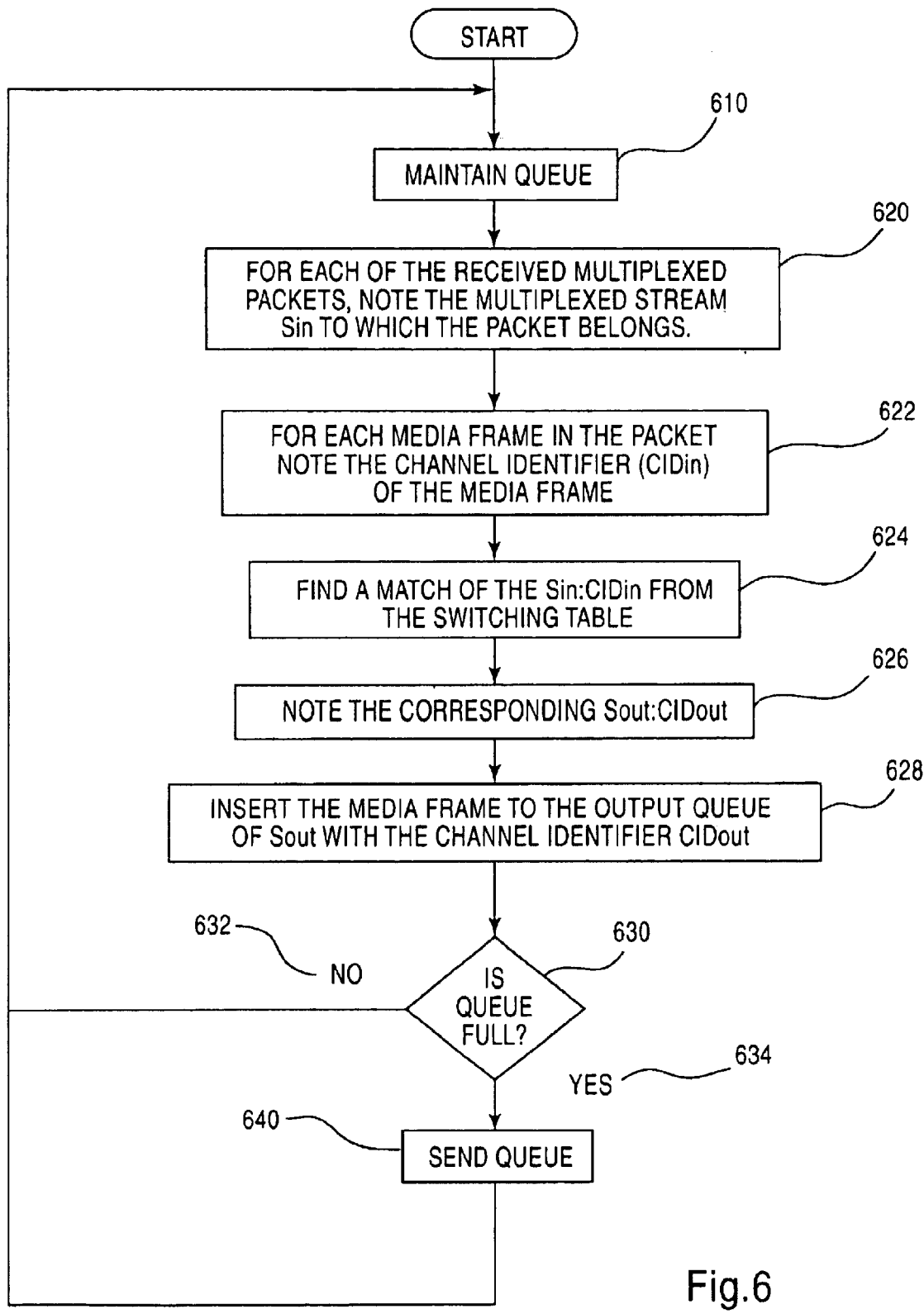
FIG. 6 illustrates the method of switching performed by a switching fabric according to the present invention.

The switching can be performed by a switch according to the flow chart illustrated in FIG. 6. For each outgoing multiplex stream an output queue is maintained 610. A determination is made as to whether the queue is full 630. When the queue is full 634, the multiplexed IP packets therein will be sent 640. The fullness of the queue can be determined by the amount of data stored, by the time since the first media frame was queued, or by some other means.

The initial formation of the multiplex streams and the associated switching tables is done in the setup phase of the media frame streams. The switching method according to the present invention is applied to each of the received multiplexed packets. First, the multiplex stream $S_{in}$ to which this packet belongs is noted 620. Then, for each media frame in the packet, the channel identifier $CID_{in}$ of the media frame is noted 622, a match of the $S_{in}:CID_{in}$ from the switching table is found 624 and the corresponding $S_{out}:CID_{out}$ is noted 626 and the media frame is inserted to the output queue of $S_{out}$ with the channel identifier $CID_{out}$ 628. If the queue is not full, additional packets are processed 632. As mentioned above, when the queue is full 634, the multiplexed IP packets therein will be sent 640.

Figure 7:
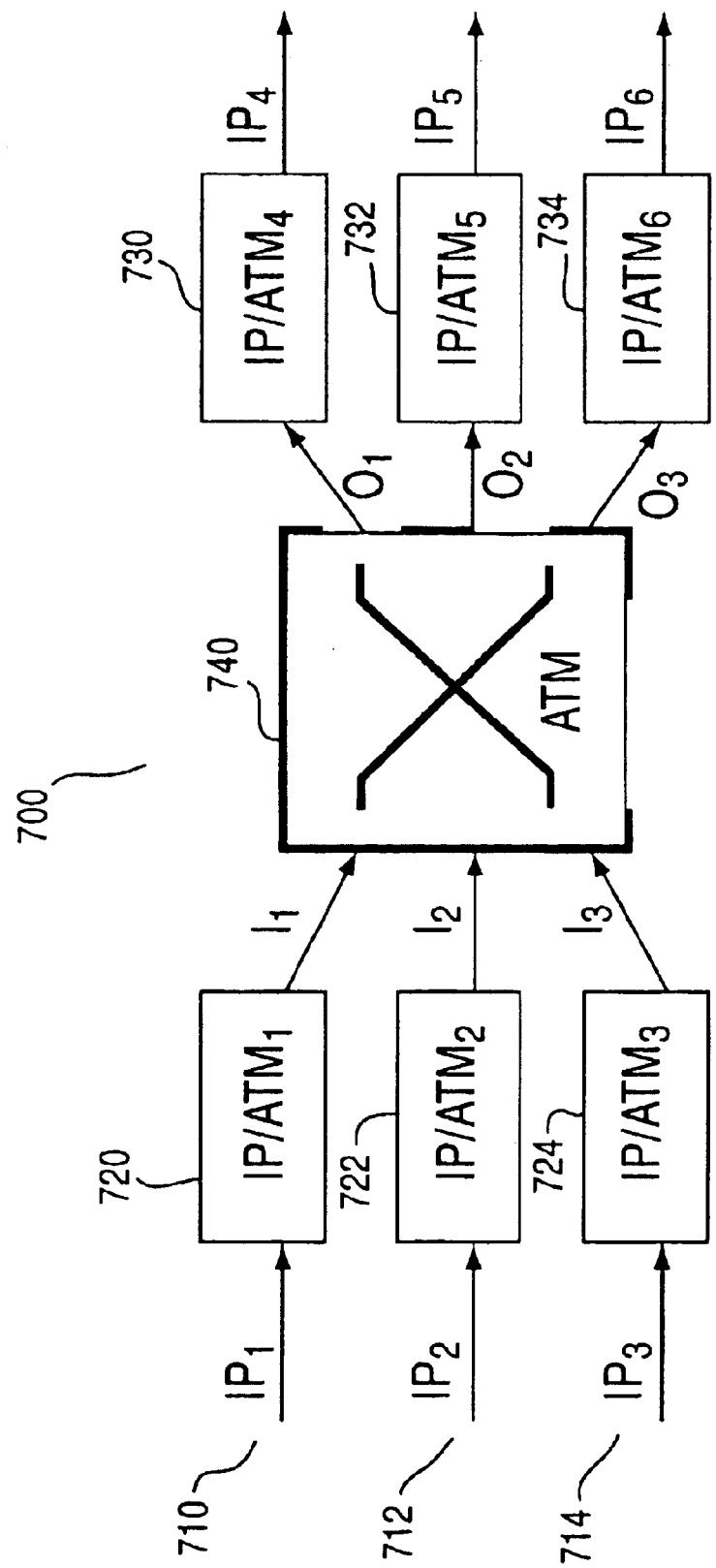
FIG. 7 illustrates a hardware implementation of the switching method of the present invention.

The above switching method may be implemented in hardware as illustrated in FIG. 7. The delay is then deterministic with less jitter, and possibly higher throughput. Finally, existing ATM switching hardware may be reused for IP based multiplex packet switching In FIG. 7, ATM switching hardware is illustrated. IP streams 710–714 are shown being received by receiving IP/ATM interfaces 720–724 and provided at the output of the ATM switch 700 by output IP/ATM interfaces 730–734. For each received multiplexed IP packet, the receiving IP/ATM interfaces 720–724 converts IP packets to ATM cells. For each ATM cell processed by the ATM switch fabric 740, the output IP/ATM interfaces 730–734 converts ATM cells to IP packets. The receiving IP/ATM interfaces 720–724, output IP/ATM interfaces 730–734 and the ATM switch fabric 740 form a processing core.

Figure 8A:
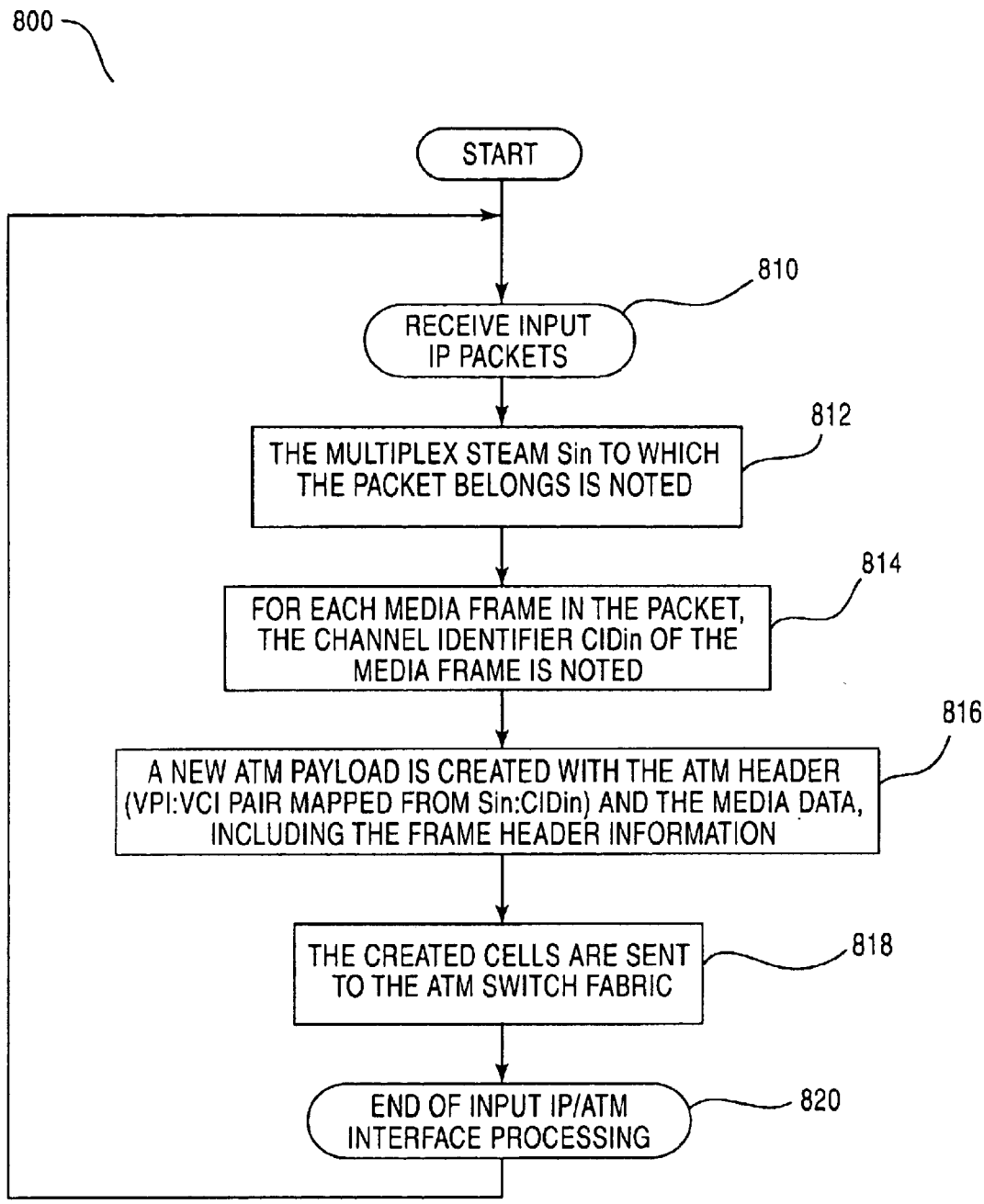
FIGS. 8a and 8b illustrate flow charts for the processes performed by the IP/ATM interfaces.
Figure 8B:
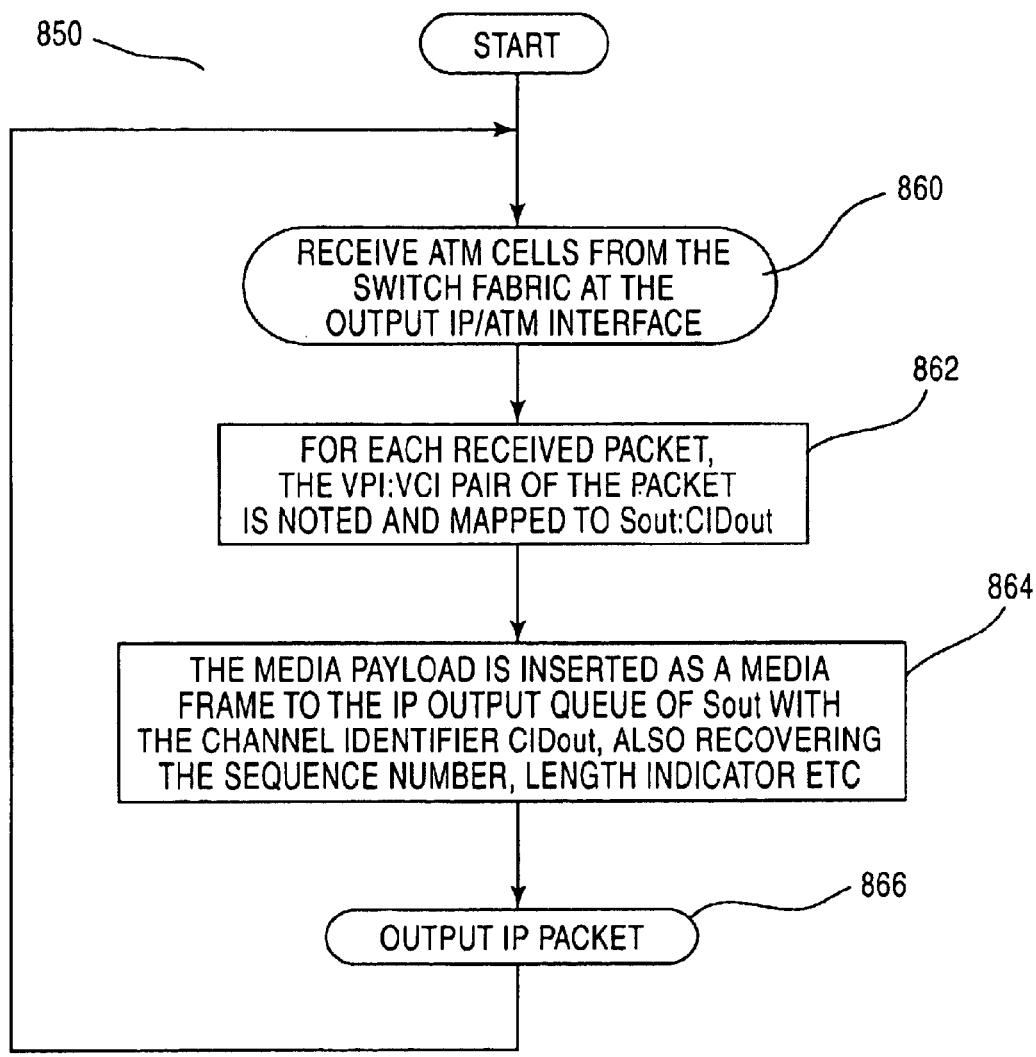

FIGS. 8a and 8b illustrate flow charts 800, 850 for the processes performed by the IP/ATM interfaces. From IP to ATM, as illustrated in FIG. 8a, IP packets are received at the input of an input IP/ATM interface 810. The multiplex stream $S_{in}$ to which this packet belongs is noted 812 and for each media frame in the packet, the channel identifier $CID_{in}$ of the media frame is noted 814. A new ATM payload is created with the ATM cell header (VPI:VCI pair mapped from $S_{in}:CID_{in}$) and the media data, including the frame header information (e.g., mapped to AAL5 CPCS-PDU trailer) 816 and the created cells are sent to the ATM switch fabric 818, thereby completing the input IP/ATM interface processing until additional IP packets are received 820.

At the ATM switch fabric, the ATM cells are routed according to a switching table, for example, as illustrated in Table 1 above and described with reference to FIG. 6. Those skilled in the art will recognize that in the case of ATM switching hardware, the multiplex stream identifier, channel identifier pair is mapped 1:1 to the ATM interface identifier, virtual path identifier, and virtual channel identifier triplet. Any possible reserved values for the VPI and/or VCI can be avoided by blocking usage of the corresponding channel identifiers and port numbers on the IP side. Accordingly, the switching table of the ATM switch fabric is fed with the VPI:VCI to VPI:VCI mappings similar to the mapping illustrated in Table 1.

From ATM to IP, as illustrated in 8b, the ATM cells exit the queues of the ATM switch fabric and are provided to the output IP/ATM interfaces 860. For each received packet, the VPI:VCI pair of the packet is noted and mapped to $S_{out}:CID_{out}$ 862. The media payload is inserted as a media frame to the IP output queue of $S_{out}$ with the channel identifier $CID_{out}$, also recovering the sequence number, length indicator etc. 864 (e.g., from the AAL5-style CPCS-PDU trailer). The IP packet is then provided at the output 866.

Figure 9:
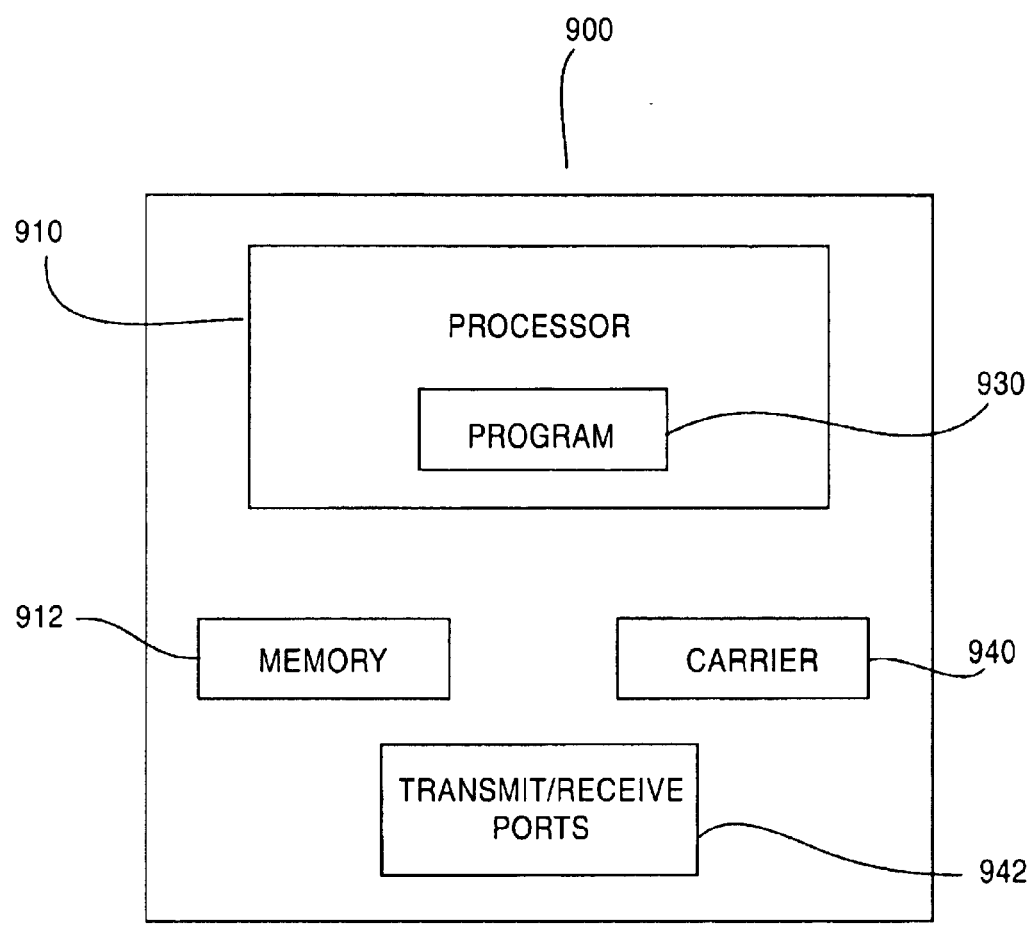
FIG. 9 illustrates a block diagram of a hardware implementation of the present invention.

FIG. 9 illustrates a block diagram of a switch 900 for switching multiplexed IP media streams according to the present invention. The switch 900 includes a processor 910 and memory or buffer 912 which may include random access memory (RAM), or any other memory configuration. The processor 910 operates under the control of an operating system (not shown) and is configured to execute one or more computer programs, which are represented in FIG. 9 by the "box" 930 within the block indicating the processor 910. Generally, the computer programs 930 may be tangibly embodied in a computer-readable medium or carrier 940. The computer programs 930 may be loaded from the computer-readable medium or carrier 940 into memory 912 for execution by the processor 910 as discussed above with reference to FIGS. 5–8b.

The computer program 930 includes instructions which, when read and executed by the processor 910, causes the processor 910 to perform the steps necessary to execute the steps or elements of the present invention. IP media streams are received via ports 942, buffered in memory 912, and the transmitted via ports 942 under control of the processor 910, which provides port switching as discussed above with reference to FIGS. 5–8b. Those skilled in the art will therefore recognize that memory 912 may be separate memory devices for running the program 930 and for buffering IP media streams, or may be a single memory device.

Further, although an exemplary system configuration is illustrated in FIG. 9, those skilled in the art will recognize that any number of different configurations performing similar functions may be used in accordance with the present invention.

In summary, the present invention provides efficient switching of multiplexed media frame streams at the application level. Further, according to the present invention, ATM hardware can be used to provide an efficient hardware based implementation.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of switching multiplexed streams, comprising:
   receiving a multiplexed IP packet having multiple media frames for switching;
   identifying an input multiplexed stream to which the received multiplexed IP packet belongs;
   noting a channel identifier of each media frame in the received multiplexed IP packet; wherein each channel identifier is associated with a particular multiplexed streams;
   identifying an output multiplexed stream and channel identifier corresponding to the input multiplexed stream and channel identifier for each frame in the received multiplexed IP packet; and
   inserting each frame for transmission to an output queue associated with the identified corresponding multiplexed stream and channel identifier.

2. The method of claim 1 further comprising determining when a queue is full and sending the contents of the queue when the queue is determined to be full.

3. The method of claim 2 wherein the queue is determined to be full according to a predetermined parameter, the parameter comprising the amount of data stored or the time since the first media frame was queued.

4. The method of claim 1 wherein the receiving a multiplexed IP packet for switching further comprising converting received multiplexed IP packets to ATM cells.

5. The method of claim 4 wherein the converting a received multiplexed IP packets to ATM cells further comprises:
   noting the multiplex stream to which this packet belongs;
   identifying the channel identifier for each media payload in the received packet;
   creating a new ATM cell having a ATM cell header, the ATM cell header including a VPI:VCI pair mapped from the noted multiplexed stream and the identified channel identifier;
   placing the media payload in the new ATM cell; and
   sending the new ATM cell including frame header for switching.

6. The method of claim 1 wherein the frames for transmission in the queue comprise ATM cells, and the sending the contents of the queue further comprises converting the ATM cells to multiplexed IP packets.

7. The method of claim 6 wherein the converting ATM cells to multiplexed IP packets further comprises:
   receiving ATM cells having a payload from the queues as packets for transmission;
   noting the VPI:VCI pair of each of the ATM cells received from the queues as packets for transmission;
   mapping the VPI:VCI pair of each of the ATM cells received from the queues as packets for transmission to an identified multiplexed stream associated with a channel identifier;
   inserting the payload as a frame to an IP output queue of the identified multiplexed stream with the channel identifier; and
   transmitting the IP output queue when the IP output queue is determined to be full.

8. The method of claim 7 further comprising recovering the sequence number, length indicator from the ATM cell.

9. An article of manufacture for a processor-based switch, the article of manufacture comprising a computer readable medium having instructions for causing a processor to perform a method comprising:
   receiving a multiplexed IP packet having multiple media frames for switching;
   identifying an input multiplexed stream to which the received multiplexed IP packet belongs;
   noting a channel identifier of each media frame in the received multiplexed IP packet; wherein each channel identifier is associated with a particular multiplexed streams;
   identifying an output multiplexed stream and channel identifier corresponding to the input multiplexed stream and channel identifier for each frame in the received multiplexed IP packet; and
   inserting each frame for transmission to an output queue associated with the identified corresponding multiplexed stream and channel identifier.

10. The article of manufacture of claim 9 further comprising
   determining when a queue is full and sending the contents of the queue when the queue is determined to be full.

11. The article of manufacture of claim 10 wherein the queue is determined to be full according to a predetermined parameter, the parameter comprising the amount of data stored or the time since the first media frame was queued.

12. The article of manufacture of claim 9 wherein the receiving a multiplexed IP packet for switching further comprising converting received multiplexed IP packets to ATM cells.

13. The article of manufacture of claim 12 wherein the converting received multiplexed IP packets to ATM cells further comprises:
   noting the multiplex stream to which this packet belongs;
   identifying the channel identifier for each media payload in the received packet;
   creating a new ATM cell having a ATM cell header, the ATM cell header including a VPI:VCI pair mapped from the noted multiplexed stream and the identified channel identifier;
   placing the media payload in the new ATM cell; and
   sending the new ATM cell including frame header for switching.

14. The switch of claim 12 wherein the input IP/ATM interface converts a received multiplexed IP packet to ATM cells by noting the multiplex stream to which a received multiplexed IP packet belongs, identifying the channel identifier for each media payload in the received multiplexed IP packet, creating a new ATM cell having a ATM cell header, the ATM cell header including a VPI:VCI pair mapped from the noted multiplexed stream and each identified channel identifier, placing the media payload in the new ATM cell and sending the new ATM cell including frame header and media payload for switching.

15. The article of manufacture of claim 9 wherein the frames for transmission in the queue comprise ATM cells, and the sending the contents of the queue further comprises converting the ATM cells to multiplexed IP packets.

16. The article of manufacture of claim 15 wherein the converting ATM cells to multiplexed IP packets further comprises:
   receiving ATM cells having a payload from the queues as packets for transmission;
   noting the VPI:VCI pair of each of the ATM cells received from the queues as packets for transmission;
   mapping the VPI:VCI pair of each of the ATM cells received from the queues as packets for transmission to an identified multiplexed stream associated with a channel identifier;
   inserting the payload as a frame to an IP output queue of the identified multiplexed stream with the channel identifier; and
   transmitting the IP output queue when the IP output queue is determined to be full.

17. The article of manufacture of claim 16 further comprising recovering the sequence number, length indicator from the ATM cell.

18. A switch, comprising:
   a plurality of input ports for receiving packets for swtiching;
   a plurality of output ports, each of the plurality of output ports having an output queue; and
   a processing core, disposed between the plurality of input and output ports, the processing core receiving multiplexed streams from the plurality of ports, wherein the processing core identifies an input multiplexed IP media stream to which a received packet belongs, notes the channel identifier of each frame in the received packet, identifies an output multiplexed stream and channel identifier corresponding to the input multiplexed stream and channel identifier for each frame in the received packet and inserting each frame for transmission to the output queue associated with the identified corresponding multiplexed stream and channel identifier.

19. The switch of claim 18 wherein the processing core determines when an output queue is full and sends the contents of the output queue when the output queue is determined to be full.

20. The switch of claim 19 wherein the output queue is determined to be full according to a predetermined parameter, the parameter comprising the amount of data stored or the time since the first media frame was queued.

21. The switch of claim 18 further comprising an input IP/ATM interface at each of the plurality of ports, the input IP/ATM interface receiving packets in the multiplexed IP media stream and converting the received packets to ATM cells for switching.

22. The switch of claim 18 further comprising output IP/ATM interfaces associated with each of the plurality of output ports for converting ATM cells to multiplexed IP packets, notes the VPI:VCI pair of each of the ATM cells received from the queues, maps the VPI:VCI pair of each of the ATM cells received from the queues to an identified multiplexed stream associated with a channel identifier, converts the ATM cell to an IP packet, places the converted IP packet in an IP output queue of the identified multiplexed stream with the channel identifier and transmits the IP output queue when the IP output queue is determined to be full.

23. The switch of claim 22 wherein the IP output queue is determined to be full according to a predetermined parameter, the parameter comprising the amount of data stored or time since the first media frame was queued.

24. The switch of claim 22 wherein the output IP/ATM interface recovers the sequence number, length indicator from the ATM cell.

* * * * *